United States Patent
Oda et al.

(10) Patent No.: US 10,020,005 B2
(45) Date of Patent: Jul. 10, 2018

(54) NOISE DETECTION DEVICE, NOISE DETECTION METHOD, AND NOISE DETECTION PROGRAM

(71) Applicant: JVC KENWOOD Corporation, Yokohama-shi, Kanagawa (JP)

(72) Inventors: Keisuke Oda, Yokohama (JP); Takaaki Yamabe, Yokohama (JP)

(73) Assignee: JVC KENWOOD CORPORATION, Yokohama-Shi, Kanagawa (JP)

(*) Notice: Subject to any disclaimer, the term of this patent is extended or adjusted under 35 U.S.C. 154(b) by 0 days.

(21) Appl. No.: 15/093,038

(22) Filed: Apr. 7, 2016

(65) Prior Publication Data
US 2016/0379663 A1    Dec. 29, 2016

(30) Foreign Application Priority Data
Jun. 29, 2015  (JP) .................... 2015-129576

(51) Int. Cl.
*G10L 21/0232*    (2013.01)
*G10L 21/0264*    (2013.01)
(Continued)

(52) U.S. Cl.
CPC .... *G10L 21/0232* (2013.01); *G10K 2210/506* (2013.01); *G10L 21/0208* (2013.01);
(Continued)

(58) Field of Classification Search
CPC ............. G10L 21/0232; G10L 21/0264; G10L 21/0216; G10L 21/0208;
(Continued)

(56) References Cited

U.S. PATENT DOCUMENTS 4,899,289 A * 2/1990 Appel ................... G01P 5/26
                                                    324/76.22
5,903,819 A * 5/1999 Romesburg ........ G10K 11/1788
                                                    375/285
(Continued)

FOREIGN PATENT DOCUMENTS

EP            2362390 A1 *  8/2011  ......... G10L 21/0208
JP      2002-258899 A1 *  11/2002
(Continued)

OTHER PUBLICATIONS

Ding et al, An adaptive speech enhancement method for siren noise cancellation, Applied Acoustics, 2003.*
(Continued)

*Primary Examiner* — Davetta W Goins
*Assistant Examiner* — Kuassi Ganmavo
(74) *Attorney, Agent, or Firm* — Nath, Goldberg & Meyer; Jerald L. Meyer

(57) ABSTRACT

A frame signal generator is configured to generate a frame signal with a predetermined first time length from an input signal. A reference signal generator is configured to generate a reference signal from a signal located more in a past than a position of the frame signal in the input signal. A correlation value calculator is configured to calculate a correlation value between the frame signal and the reference signal within a range of a predetermined phase shift amount m. A periodic noise determiner is configured to determine whether or not the frame signal includes periodic noise, and calculate a period of the periodic noise in the case where the frame signal includes the periodic noise. A correlation value calculation range generator is configured to generate the range of the predetermined phase shift amount based on the period of the periodic noise.

6 Claims, 7 Drawing Sheets

(51) Int. Cl.
*G10L 21/0208* (2013.01)
*G10L 21/0216* (2013.01)
*H04B 15/00* (2006.01)
*G10L 25/06* (2013.01)

(52) U.S. Cl.
CPC ...... *G10L 21/0216* (2013.01); *G10L 21/0264* (2013.01); *G10L 25/06* (2013.01); *G10L 2021/02085* (2013.01); *H04B 15/005* (2013.01)

(58) Field of Classification Search
CPC ........... G10L 2021/02085; G10L 25/06; G10L 2025/783; G10L 25/78; H04B 15/005; G10K 2210/506
See application file for complete search history.

(56) References Cited

U.S. PATENT DOCUMENTS

| | | | | |
|---|---|---|---|---|
| 7,016,507 | B1* | 3/2006 | Brennan | H04R 3/00 381/23.1 |
| 2002/0184018 | A1* | 12/2002 | Kondo | G10L 19/18 704/237 |
| 2002/0196876 | A1* | 12/2002 | Takada | H04B 1/7101 375/346 |
| 2005/0096899 | A1* | 5/2005 | Padhi | G10L 15/10 704/216 |
| 2005/0276363 | A1* | 12/2005 | Joublin | 375/350 |
| 2008/0010063 | A1* | 1/2008 | Komamura | G10L 21/0208 704/226 |
| 2008/0015853 | A1* | 1/2008 | Honda | G10L 25/78 704/228 |
| 2011/0301945 | A1* | 12/2011 | Ichikawa | G10L 15/20 704/211 |
| 2013/0073283 | A1* | 3/2013 | Yamabe | G10L 21/0216 704/226 |
| 2013/0178756 | A1* | 7/2013 | Suzuki | A61B 5/0826 600/529 |
| 2014/0016730 | A1* | 1/2014 | Yanagisawa | H04B 1/10 375/346 |

FOREIGN PATENT DOCUMENTS

| | | | | |
|---|---|---|---|---|
| JP | 2003058186 A | | 2/2003 | |
| WO | WO 0055846 A1 * | | 9/2000 | ......... G10L 21/0208 |

OTHER PUBLICATIONS

Ding et al, An adaptive speech enhancement method for siren noise cancellation, Applied Acoustics, 2004.*

* cited by examiner (a) y(t) (BEFORE UPDATED)

(b) x(t)

(c) y(t) (AFTER UPDATED)

(a) REFERENCE SIGNAL y(t)

(b) FRAME SIGNAL x(t)

(c) CORRELATION VALUE A(m)

NOISE DETECTION DEVICE, NOISE DETECTION METHOD, AND NOISE DETECTION PROGRAM

CROSS REFERENCE TO RELATED APPLICATION

This application is based upon and claims the benefit of priority under 35 U.S.C. § 119 from Japanese Patent Application No. 2015-129576, filed on Jun. 29, 2015, the entire contents of which are incorporated herein by reference.

BACKGROUND

The present disclosure relates to a noise detection device, a noise detection method, and a noise detection program which detect periodic noise.

In the event of making a voice call in a mobile communicator, when an environmental sound is mixed into a target sound, in some cases, the voice call cannot be made properly. In particular, periodic noise such as a siren sound emitted from a fire engine or a police car, becomes a cause of significantly interrupting the voice call.

In Japanese Unexamined Patent Application Publication No. 2003-58186 (Patent Document 1), a noise suppressor that suppresses the periodic noise by one microphone is described.

The noise suppressor described in Patent Document 1 converts an input signal into a signal in a frequency domain, and extracts a fundamental frequency. Then, the noise suppressor described in Patent Document 1 calculates a mean square error between the fundamental frequency and the siren sound fundamental frequency pattern stored in a memory in advance.

The noise suppressor described in Patent Document 1 determines that the siren sound is present in the case where the mean square error is smaller than a preset threshold value, and determines that the siren sound is not present in the case where the mean square error is larger than the preset threshold value. The noise suppressor described in Patent Document 1 suppresses the siren sound, based on whether or not the siren sound is present and based on the fundamental frequency.

SUMMARY

In an environment where the siren sound is generated, it is highly possible that not only the siren sound but also other noise such as a road noise and engine noise may be generated. In such an environment, in some cases the noise suppressor described in Patent Document 1 cannot calculate an accurate fundamental frequency.

Moreover, the noise suppressor described in Patent Document 1 converts the input signal into the signal in the frequency domain, and further, calculates the mean square error with the fundamental frequency pattern, and accordingly, has required a larger computation amount in comparison with processing in a time domain.

A first aspect of the embodiments provides a noise detection device including: a frame signal generator configured to generate a frame signal with a predetermined first time length from an input signal; a reference signal generator configured to generate a reference signal with a predetermined second time length from a signal located more in a past than a temporal position of the frame signal in the input signal; an input signal memory configured to store the frame signal and the reference signal; a correlation value calculator configured to calculate a correlation value between the frame signal and the reference signal stored in the input signal memory within a range of a predetermined phase shift amount; a periodic noise determiner configured to determine whether or not periodic noise is included in the frame signal, and calculate a period of the periodic noise; a correlation value calculation range generator configured to generate the range of the predetermined phase shift amount based on the period of the periodic noise; and a correlation value calculation range memory configured to store the range of the predetermined phase shift amount.

A second aspect of the embodiments provides a noise detection device including: a frame signal generator configured to generate a frame signal with a predetermined first time length from an input signal; a reference signal generator configured to generate a reference signal with a predetermined second time length from a signal located more in a past than a temporal position of the frame signal in the input signal; an input signal memory configured to store the frame signal and the reference signal; a correlation value calculator configured to calculate a correlation value between the frame signal and the reference signal stored in the input signal memory within a range of a predetermined phase shift amount; a periodic noise determiner configured to determine whether or not periodic noise is included in the frame signal, and calculate a period of the periodic noise; a correlation value calculation range generator configured to generate the range of the predetermined phase shift amount for each of a plurality of the periodic noises based on the periods of the plurality of periodic noises; and a correlation value calculation range memory configured to store the range of the predetermined phase shift amount for each of the plurality of periodic noises.

A third aspect of the embodiments provides a noise detection method including: generating a frame signal with a predetermined first time length from an input signal; generating a reference signal with a predetermined second time length from a signal located more in a past than a temporal position of the frame signal in the input signal; calculating a correlation value between the frame signal and the reference signal within a range of a predetermined phase shift amount; determining whether or not periodic noise is included in the frame signal, and calculating a period of the periodic noise; and generating the range of the predetermined phase shift amount based on the period of the periodic noise.

A fourth aspect of the embodiments provides a computer program product stored in a non-transitory computer readable medium for causing a computer to perform the steps of: a step of generating a frame signal with a predetermined first time length from an input signal; a step of generating a reference signal with a predetermined second time length from a signal located more in a past than a temporal position of the frame signal in the input signal; a step of calculating a correlation value between the frame signal and the reference signal within a range of a predetermined phase shift amount; a step of determining whether or not periodic noise is included in the frame signal, and calculating a period of the periodic noise; and a step of generating the range of the predetermined phase shift amount based on the period of the periodic noise.

DETAILED DESCRIPTION

First Embodiment

Figure 1:
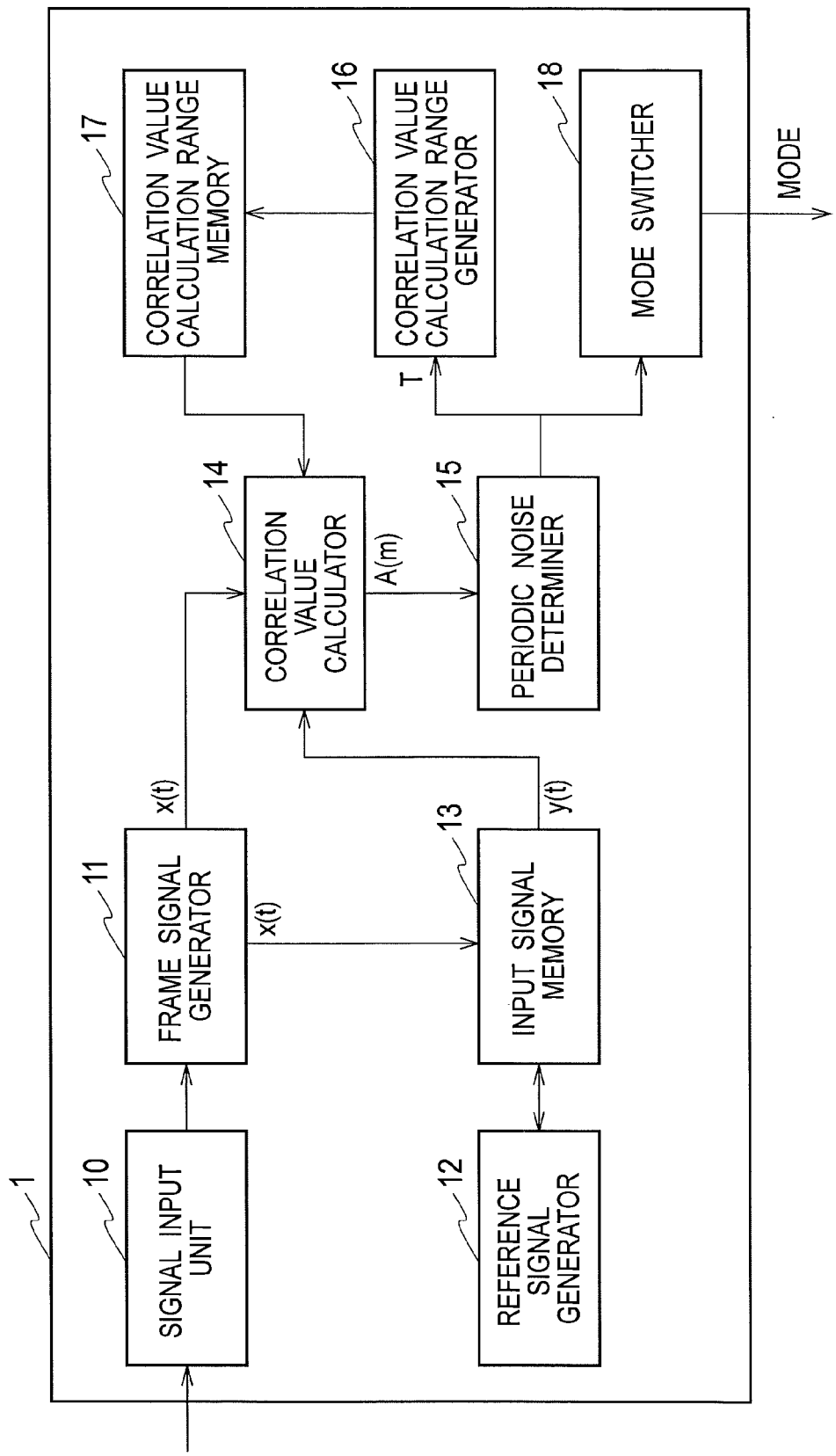
FIG. 1 is a block diagram showing a noise detection device according to the first embodiment.

A description is made below of a first embodiment with reference to the accompanying drawings. FIG. 1 shows a block diagram of a noise detection device 1 according to the first embodiment. The noise detection device 1 according to the first embodiment includes: a signal input unit 10; a frame signal generator 11; a reference signal generator 12; an input signal memory 13; a correlation value calculator 14; a periodic noise determiner 15; a correlation value calculation range generator 16; a correlation value calculation range memory 17; and a mode switcher 18.

The signal input unit 10, the input signal memory 13, and the correlation value calculation range memory 17 are composed of hardware. Moreover, the frame signal generator 11, the reference signal generator 12, the correlation value calculator 14, the periodic noise determiner 15, the correlation value calculation range generator 16, and the mode switcher 18 are realized by a noise detection program executed by a computing unit such as a CPU or a DSP. In this case, the noise detection program is stored in a variety of computer-readable mediums, and is supplied to a computer. The respective constituents realized by the program may be composed of hardware.

The signal input unit 10 acquires an input signal from a voice acquisition unit (not shown), and converts the input signal into a digital signal. In a case where the input signal is already of a digital value, the signal input unit 10 does not have to include a configuration for converting the input signal into the digital signal. The signal input unit 10 supplies the input signal, which is converted into the digital signal, to the frame signal generator 11.

The frame signal generator 11 generates a frame signal x(t) with a predetermined length n from the input signal, supplied from the signal input unit 10. The predetermined length n is a first time length. Here, desirably, the predetermined length n is approximately 0.03 seconds to 0.04 seconds in order to enable the noise detection device 1 according to the first embodiment to detect periodic noise in a period of less than 1 second. The frame signal generator 11 supplies the generated frame signal x(t) to the input signal memory 13 and the correlation value calculator 14.

Based on a reference signal y(t) stored by the input signal memory 13 to be described later and based on a frame signal x(t) in a frame that is one frame before a newest one, the reference signal generator 12 generates a new reference signal y(t), and updates the reference signal y(t) stored by the input signal memory 13. The reference signal y(t) is a signal with a predetermined length N. The predetermined length N is a second time length.

The reference signal generator 12 sets the predetermined length N (second time length) to a time longer than the sum of the predetermined length n (first time length) and the period T of the periodic noise to be described later. That is, the predetermined length N is a value that satisfies n+T<N. Moreover, desirably, the predetermined length N is further a value that satisfies N<2T, for example, a length corresponding to approximately 1.5 period (1.5 T) of the period T of the periodic noise.

A reason why the reference signal generator 12 updates the reference signal y(t) every time the frame signal x(t) is generated is in order to define an input signal, which is close to the frame signal x(t) in a time series as the reference signal y(t). The correlation value calculator 14, to be described later, calculates a correlation value A(m) by using the frame signal x(t) close in the time series and the reference signal y(t), and can thereby detect the periodic noise accurately.

Figure 2:
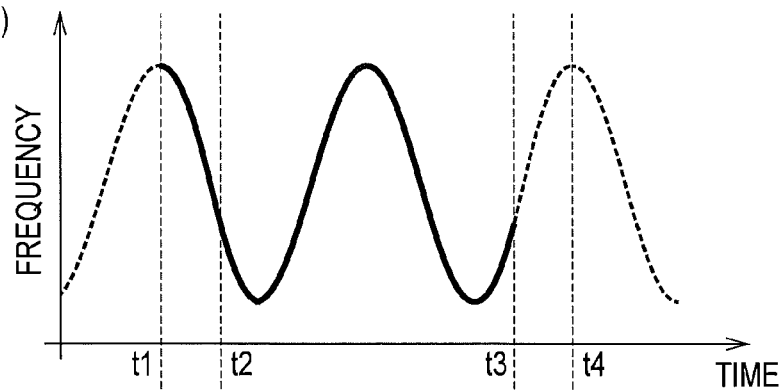
FIG. 2 is a view schematically showing a reference signal y(t).
Figure 2:
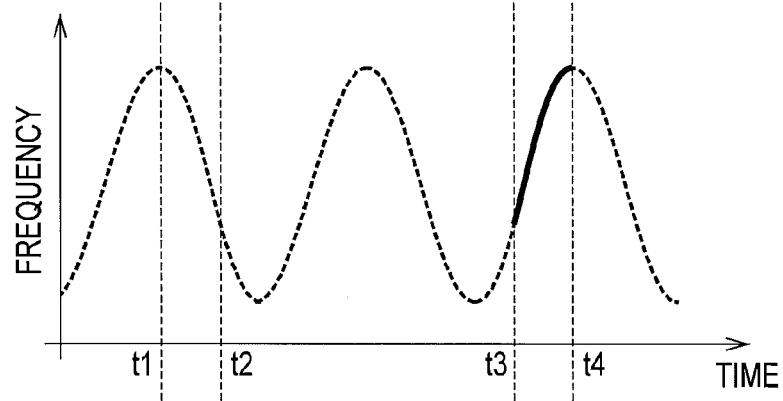
Figure 2:
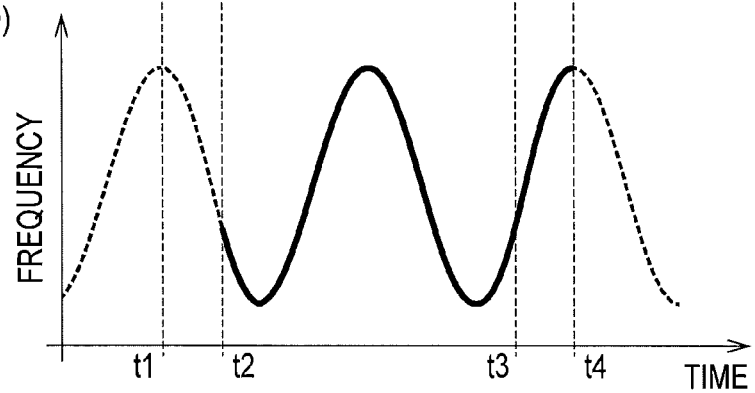

(a) of FIG. 2 is a view schematically showing a position (temporal position) of the before-updated reference signal y(t) in the input signal by a frequency domain. (b) of FIG. 2 is a view schematically showing a position of the additional frame signal x(t) in the input signal by the frequency domain. (c) of FIG. 2 is a view schematically showing a position (temporal position) of the after-updated reference signal y(t) in the input signal by the frequency domain. In each of (a) to (c) of FIG. 2, a solid line portion indicates the position of each signal in the input signal.

First, the reference signal generator 12 discards the signal from the most past time t1 to the time t2 in the before-updated reference signal y(t) shown in (a) of FIG. 2. A time from the time t1 to the time t2 is the same as a time from a time t3 to a time t4, which is shown in (b) of FIG. 2, in the frame signal x(t). Then, the reference signal generator 12 adds the frame signal x(t) at the newest time t3 of the reference signal y(t). The reference signal generator 12 generates a signal in an interval from the time t2 to the time t4 as a new reference signal y(t), which are shown in (c) of FIG. 2, and supplies the generated reference signal y(t) to the input signal memory 13.

That is, the reference signal generator 12 sequentially updates the reference signal y(t), which is stored in the input signal memory 13, so that the reference signal y(t) can be an input signal from the frame, which is one frame before the newest one, to the past frame going back therefrom by a predetermined time length.

The input signal memory 13 stores the frame signal x(t), which is supplied from the frame signal generator 11, and the reference signal y(t), which is supplied from the reference signal generator 12.

In a correlation value calculation range supplied from the correlation value calculation range memory 17, to be described later, the correlation value calculator 14 calculates the correlation value A(m) between the frame signal x(t), which is supplied from the frame signal generator 11, and the reference signal y(t), which is stored in the input signal memory 13. The correlation value calculator 14 supplies the calculated correlation value A(m) to the periodic noise determiner 15.

The correlation value calculator 14 calculates the correlation value A(m) by using Equation (1). m is a phase shift amount between the frame signal x(t) and the reference signal y(t). In the case of calculating the correlation value A(m) in an entire range of the reference signal y(t), a range of the phase shift amount m is 0≤m<N−n.

$$A(m) = \Sigma[t=0, n-1] x(t) \cdot y(t+m) \quad (1)$$

Figure 3:
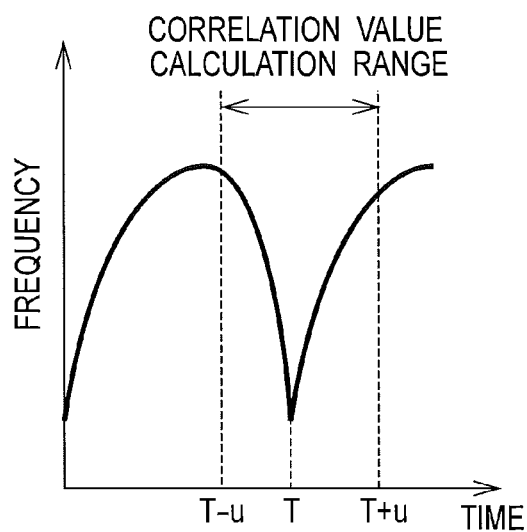
FIG. 3 is a view schematically showing examples of the reference signal y(t), a frame signal x(t), and a correlation value A(m).
Figure 3:
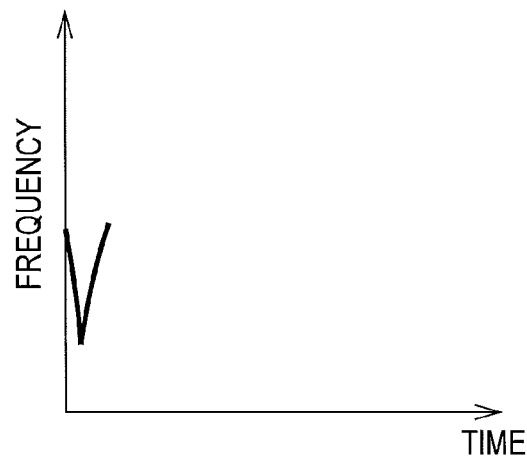
Figure 3:
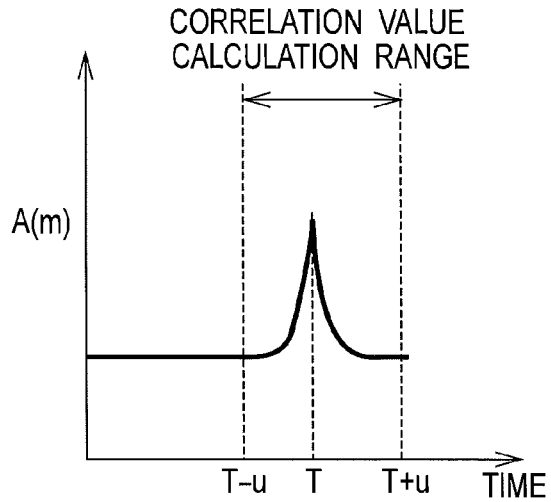

(a) of FIG. 3 is a view schematically showing an example of the reference signal y(t) in the frequency domain. An example of the reference signal y(t) shown in FIG. 3(a) is a signal corresponding to a 1.5 period of the periodic noise in which the frequency is changed periodically.

(b) of FIG. 3 is a view schematically showing an example of the frame signal x(t) in the frequency domain. An example of the frame signal x(t) shown in (b) of FIG. 3 is a signal corresponding to 1 frame of the same periodic noise signal as in (a) of FIG. 3.

In order to reduce the computation amount, the correlation value calculator 14 calculates the correlation value A(m) not in the entire range 0≤m<N−n of the reference signal y(t) but in the correlation value calculation range stored by the correlation value calculation range memory 17.

Specifically, the correlation value calculator 14 calculates the correlation value A(m) in a range of T−u≤m<T+u by using the period T of the periodic noise, which is calculated by the periodic noise determiner 15, to be described later, and the value u that satisfies 0≤u≤T.

Here, a description is made of a reason for calculating the correlation value A(m) in the correlation value calculation range. The input signal memory 13 stores, as the reference signal y(t), the input signal from the frame, which is one frame before the newest one, to the past frame going back therefrom by a predetermined time length. Moreover, the periodic noise is a signal of a fixed period T.

In this case, the frame signal x(t) is a signal located immediately after the reference signal y(t) in the time series in the input signal. That is, a relative positional relationship between the reference signal y(t) and the frame signal x(t) becomes constant, and as a result, the peak position of the correlation value A(m) also becomes constant.

Hence, if the correlation value calculator 14 calculates the correlation value A(m) in the correlation value calculation range T−u<m<T+u, then the correlation value calculator 14 can obtain the peak position of the correlation value A(m).

(c) of FIG. 3 is a view schematically showing the correlation value A(m) calculated in the range of 0≤m<N−n by the correlation value calculator 14. It is understood that the peak of the correlation value appears in the correlation value calculation range. In such a case where the correlation value calculator 14 calculates the correlation value A(m) in the range of T−u<m<T+u, the correlation value A(m) appears only in the correlation value calculation range shown by a two-way arrow.

The periodic noise determiner 15 determines whether or not the frame signal x(t) includes the period noise based on the correlation value A(m) supplied from the correlation value calculator 14. Specifically, in the case where the correlation value A(m) includes a correlation value higher than a predetermined threshold value, the periodic noise determiner 15 determines that the frame signal x(t) includes the periodic noise, and in the case where the correlation value A(m) does not include the correlation value higher than the predetermined threshold value, the periodic noise determiner 15 determines that the frame signal x(t) does not include the periodic noise.

Here, the periodic noise determiner 15 calculates the predetermined threshold value Th in the following manner. First, the periodic noise determiner 15 calculates a sum of squares B of the frame signal x(t) shown in (b) of FIG. 3 by using Equation (2).

$$B = \Sigma[t=0, n-1] x(t) \cdot x(t) \quad (2)$$

The periodic noise determiner 15 calculates the threshold value Th by using Equation (3). α is a predetermined value that satisfies 0.5≤α<1.0. Note that a is set to a value in a range of 0.6 to 0.7.

$$Th = \alpha \cdot B \quad (3)$$

Figure 4:
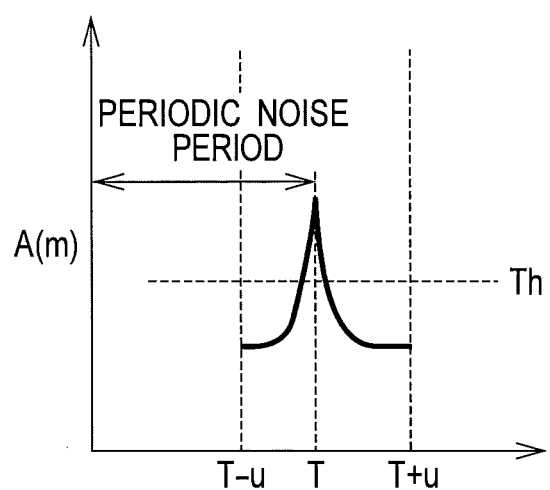
FIG. 4 is a view schematically showing a comparison between the correlation value A(m) and the threshold value Th.

FIG. 4 is a view schematically showing a comparison between the correlation value A(m) and the threshold value Th. Since the peak position of the correlation value A(m) exceeds the threshold value Th, FIG. 4 shows that the frame signal x(t) in the case of FIG. 4 includes the periodic noise.

In the case of N<2T, the phase shift amount m, in which the correlation value A(m) indicates the peak position, is the period T of the periodic noise. In the case of 2T≤N, among such peak positions of the correlation value A(m), the peak position in which the phase shift amount m is smallest is the period T of the periodic noise.

The periodic noise determiner 15 supplies a determination result as to whether or not the frame signal x(t) includes the periodic noise to the mode switcher 18. Moreover, in the case where the frame signal x(t) includes the periodic noise, the periodic noise determiner 15 supplies the period T of the periodic noise to the correlation value calculation range generator 16.

Based on the period T of the periodic noise supplied from the periodic noise determiner 15, and based on the value u, to be described later, the correlation value calculation range generator 16 creates the correlation value calculation range T−u<m<T+u. The correlation value calculation range generator 16 supplies the generated correlation value calculation range to the correlation value calculation range memory 17.

Specifically, based on the period T of the periodic noise, the correlation value calculation range generator 16 calculates the value u by using Equation (4). β is a predetermined value that satisfies 0<β<0.5.

$$u = \beta \cdot T \quad (4)$$

The correlation value calculation range generator 16 may calculate the value u based on a difference value between a representative value such as a mean value and median value of the periods T of the periodic noise in a plurality of frames in the past and the period T of the periodic noise in the current frame.

The correlation value calculation range generator 16 may calculate the value u based on a value indicating a scattering such as dispersion and standard deviation of the period T of the periodic noise in the plurality of past frames.

In the case where the periodic noise determiner 15 stops detecting the periodic noise, the correlation value calculation range generator 16 may perform processing for extending the correlation value calculation range. In this case, the extended correlation value calculation range may be any range as long as the range stays between 0≤m<N-n that is the entire range of the reference signal y(t) and T-u<m<T+u that is the correlation value calculation range immediately before.

The correlation value calculation range generator 16 may generate the correlation value calculation range as T−v<m<T+u or T−u<m<T+v by using a value v different from the value u. Note that predetermined constant values may be used as the value u and the value v. That is, the correlation value calculation range generator 16 sets the range of the phase shift amount m to a range including the period T of the periodic noise.

The correlation value calculation range memory 17 stores the correlation value calculation range supplied from the correlation value calculation range generator 16. The correlation value calculation range memory 17 may store the periods T of the periodic noise in the past frames and the correlation value calculation ranges in the past frames.

The correlation value calculation range memory 17 may generate the correlation value calculation range only in the case where the periodic noise is detected in a plurality of frames in the past, and the period T of the periodic noise is present within the fixed or predetermined range.

The mode switcher 18 switches a mode between a mode of removing the periodic noise (hereinafter, referred to as a "periodic noise removing mode") and a mode of not removing the periodic noise (hereinafter, referred to as "other mode") based on the determination result as to whether or not the frame signal x(t) includes the periodic noise, the determination result being supplied from the periodic noise determiner 15. Then, the mode switcher 18 supplies such a current mode to a periodic noise remover (not shown).

Desirably, the mode switcher 18 performs control to switch the mode to the periodic noise removing mode in the case where results that the frame signal x(t) include the periodic noise, and are supplied from the periodic noise determiner 15 continuously for a predetermined time.

The mode switcher 18 may switch the mode by the following processing. In the case where such a result that the frame signal x(t) includes the periodic noise is supplied from the periodic noise determiner 15, the mode switcher 18 adds 1 to a count value in which an initial value is 0, and in such a case where the result that the frame signal x(t) does not include the periodic noise is supplied therefrom, the mode switcher 18 subtracts 1 from the count value.

In the case where the count value reaches a first threshold value, the mode switcher 18 switches the mode from the other mode to the periodic noise removing mode, and in the case where the count value reaches a second threshold value, the mode switcher 18 switches the mode from the periodic noise removing mode to the other mode. A maximum value of the count value is the first threshold value, and a minimum value thereof is the second threshold value.

Figure 5:
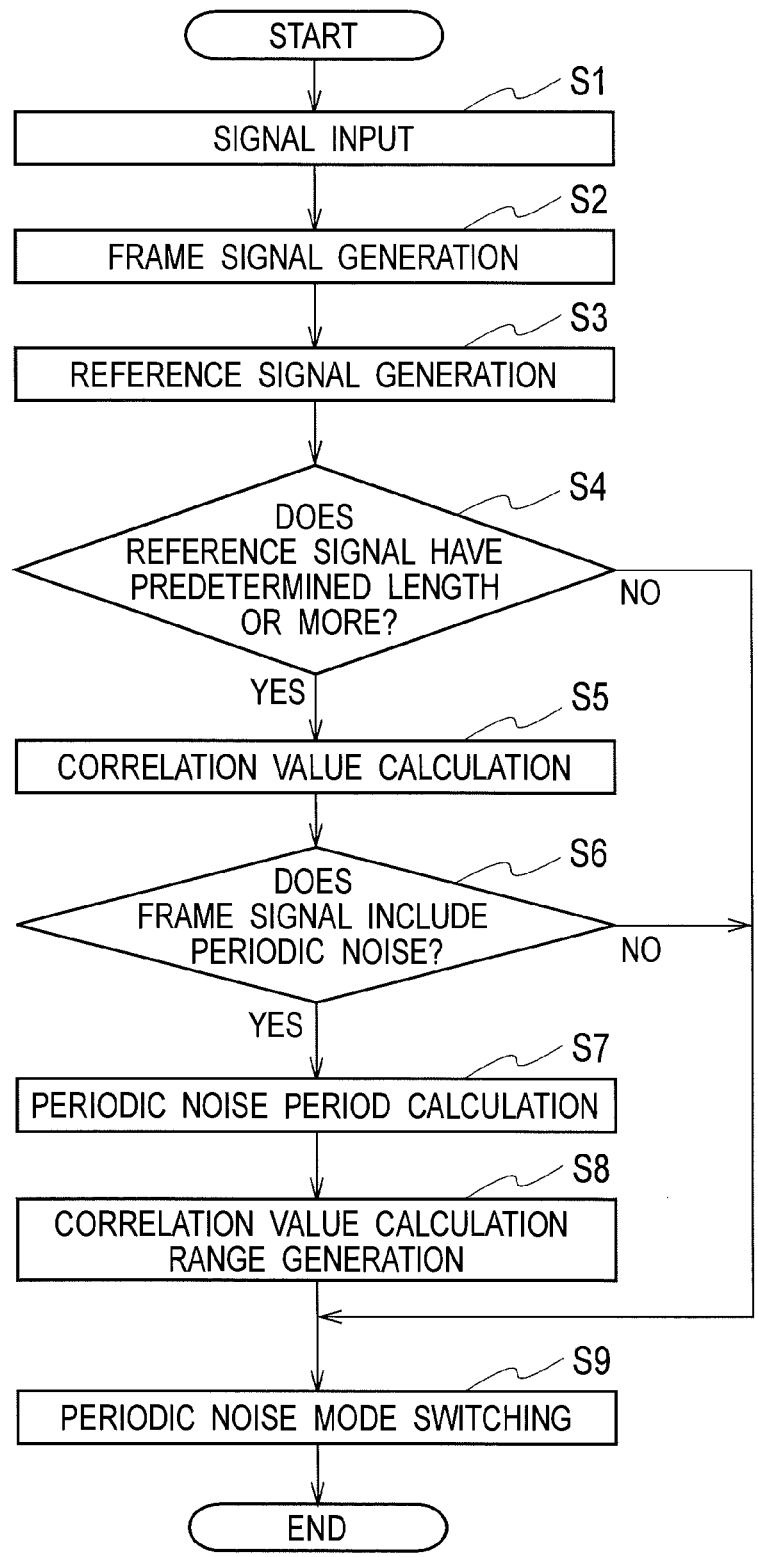
FIG. 5 is a flowchart showing processing in the noise detection device according to the first embodiment, showing a procedure in which a noise detection method and a noise detection program cause a computer to execute.

Next follows of a description of operations of the noise detection device 1 according to the first embodiment, by using a flowchart shown in FIG. 5. The operations to be described below are similar to those in a procedure executed in the noise detection method and the noise detection program, according to the embodiment.

In step S1, the signal input unit 10 converts the input signal into a digital signal, and supplies the converted digital signal to the frame signal generator 11.

In step S2, the frame signal generator 11 generates the frame signal x(t) with the predetermined length from the input signal supplied from the signal input unit 10. In step S3, the reference signal generator 12 generates the reference signal y(t).

In step S4, the correlation value calculator 14 determines whether or not the reference signal y(t) stored by the input signal memory 13 has a predetermined length. In the case where the reference signal y(t) has a predetermined length or more (step S4: YES), the correlation value calculator 14 shifts the processing to step S5. In the case where the reference signal y(t) has a length less than the predetermined length (step S4: NO), the correlation value calculator 14 shifts the processing to step S9.

In step S5, the correlation value calculator 14 calculates the correlation value A(m) based on the frame signal x(t) and the reference signal y(t).

In step S6, the periodic noise determiner 15 compares the correlation value A(m) with the predetermined threshold value, and determines whether or not the frame signal x(t) includes the periodic noise.

In the case where the frame signal x(t) includes the periodic noise (step S6: YES), the periodic noise determiner 15 shifts the processing to step S7. In the case where the frame signal x(t) does not include the periodic noise (step S6: NO), the periodic noise determiner 15 shifts the processing to step S9.

In step S7, the periodic noise determiner 15 calculates the period T of the periodic noise. In step S8, the correlation value calculation range generator 16 generates the correlation value calculation range based on the period T of the periodic noise.

In step S9, the mode switcher 18 switches the mode between the periodic noise removing mode and the other mode based on whether or not the frame signal x(t) includes the periodic noise.

By the above-described processing, the noise detection device 1, according to the first embodiment, can detect the periodic noise accurately by means of a small computation amount.

Second Embodiment

The first embodiment has such a configuration of sequentially generating the correlation value calculation range based on the period of the periodic noise included in the input signal. Meanwhile, the second embodiment has a configuration of generating the correlation value calculation ranges in advance for a plurality of the periodic noises.

Figure 6:
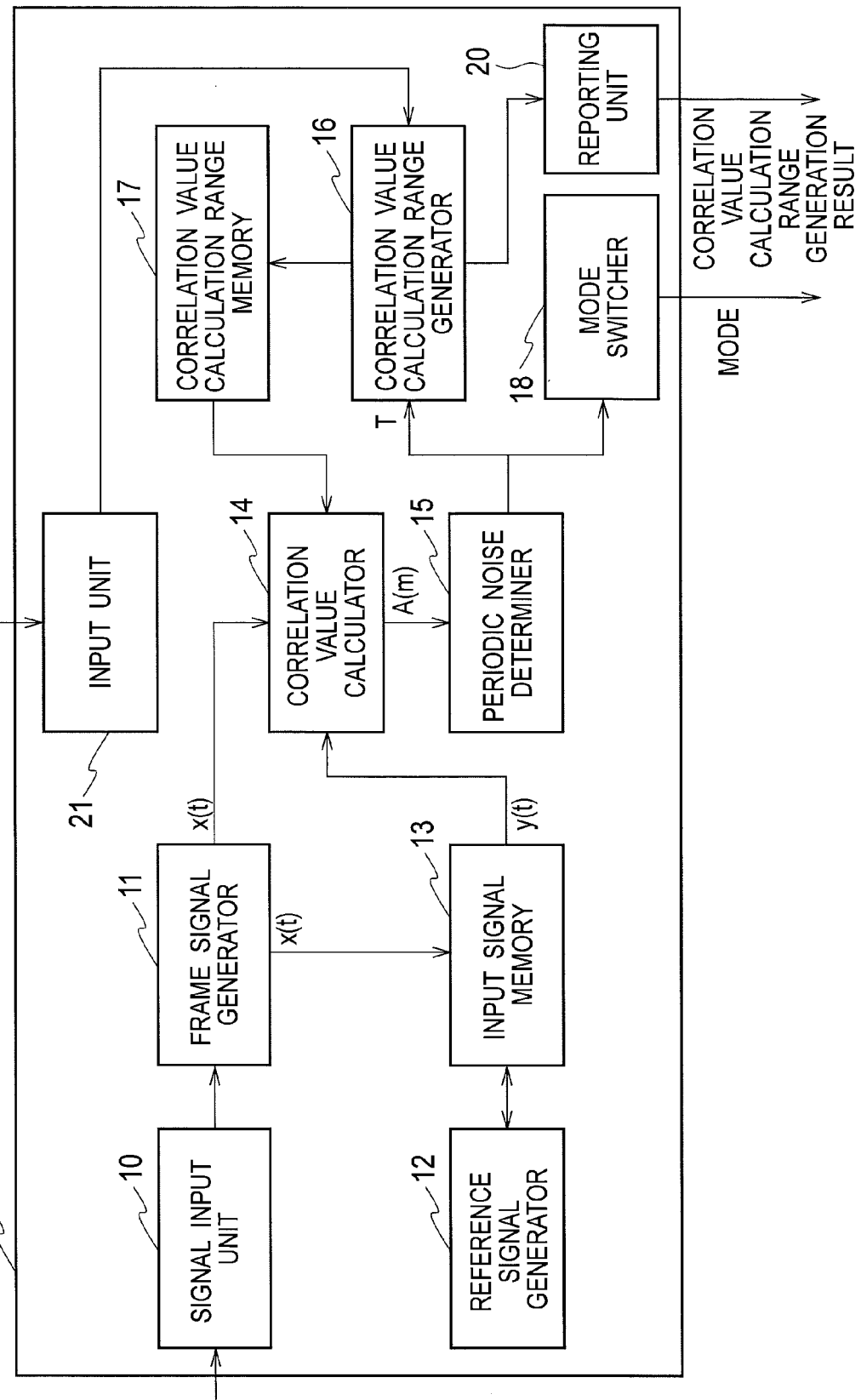
FIG. 6 is a block diagram showing a noise detection device according to the second embodiment.

A description is made of the second embodiment with reference to the accompanying drawings. FIG. 6 shows a block diagram of a noise detection device 2, according to the second embodiment. The noise detection device 2, according to the second embodiment, includes: a signal input unit 10; a frame signal generator 11; a reference signal generator 12; an input signal memory 13; a correlation value calculator 14; a periodic noise determiner 15; a correlation value calculation range generator 16; a correlation value calculation range memory 17; a mode switcher 18; a reporting unit 20; and an input unit 21.

The respective blocks, which are the signal input unit 10, the frame signal generator 11, the reference signal generator 12, the input signal memory 13, and the mode switcher 18, are common to those of the first embodiment, and accordingly, a description thereof is omitted.

In the plurality of correlation value calculation ranges generated in advance by the correlation value calculation range generator 16, to be described later, the correlation value calculator 14 calculates the correlation value A(m) between the frame signal x(t) and the reference signal y(t), and supplies the calculated correlation value to the periodic noise determiner 15.

Figure 7:
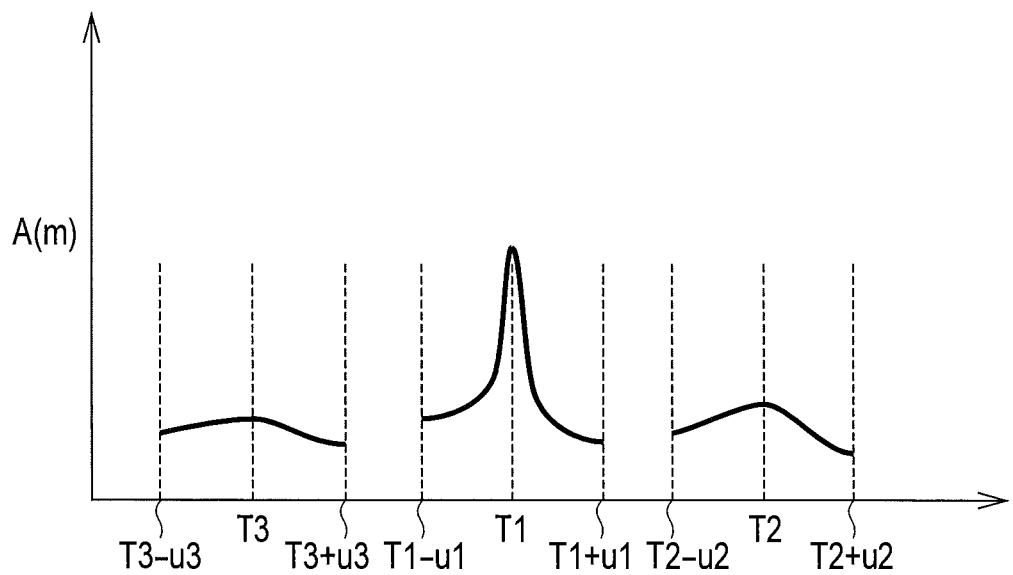
FIG. 7 is a view schematically showing the correlation value A(m) in the case of a plurality of correlation value calculation ranges.

FIG. 7 is a view schematically showing the correlation value A(m) calculated in correlation value calculation ranges of three types of the periodic noises, in which periods are T1, T2 and T3. The correlation value calculation ranges of three types of the periodic noises are individually $T1-u1 \leq m < T1+u1$, $T2-u2 \leq m < T2+u2$, and $T3-u3 \leq m < T3+u3$. In FIG. 7, the respective intervals are defined as exclusive intervals; however, they may be defined as overlapping intervals.

The periodic noise determiner 15 determines whether or not the frame signal x(t) includes the period noise, based on the correlation value A(m) supplied from the correlation value calculator 14, and supplies a result of the determination to the mode switcher 18. In addition to such a determination results, the periodic noise determiner 15 may supply the type of periodic noise which the frame signal x(t) includes to the mode switcher 18. In this case, the mode switcher 18 may supply the type of periodic noise which is included in the input signal to a periodic noise remover (not shown).

Figure 8:
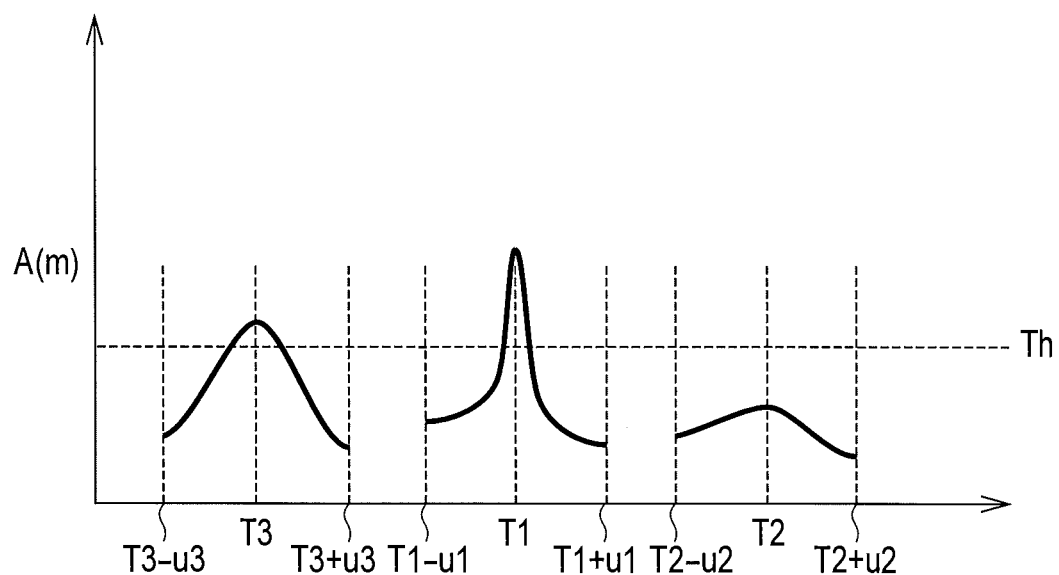
FIG. 8 is a view schematically showing a comparison between the correlation value A(m) and the threshold value Th in the case of a plurality of correlation value calculation ranges.

FIG. 8 is a view schematically showing a comparison between the correlation value A(m) and the threshold value Th, in the case where the correlation value A(m) includes a correlation value which is higher than the predetermined threshold value Th in a plurality of intervals. In FIG. 8, the correlation value A(m) exceeds the threshold value Th in the period T1 and the period T3. In this case, the periodic noise determiner 15 determines that the periodic noise in the period T1 is present, which is the periodic noise in the interval where the correlation value A(m) indicates the maximum value.

In the second embodiment, in the case of implementing noise detection processing by information to be supplied from the input unit 21, to be described later, the correlation value calculation range generator 16 does not generate the correlation value calculation ranges. In the case of implementing correlation value calculation range generation processing by the information to be supplied from the input unit 21, to be described later, the correlation value calculation range generator 16 generates the correlation value calculation ranges in advance, and supplies the generated correlation value calculation ranges to the correlation value calculation range memory 17.

Moreover, the correlation value calculation range generator 16 supplies information to the effect that the generation of the correlation value calculation ranges are completed to the reporting unit 20. The correlation value calculation range memory 17 stores the correlation value calculation ranges for each of the plurality of periodic noises.

The reporting unit 20 reports that the generation of the correlation value calculation ranges are completed to a user by letters and images (visual information) displayed on a display screen, sounds (audio information) generated by a speaker, vibrations (touch information) by a predetermined vibrator, or the like.

The user operates an operation unit (not shown), whereby an instruction signal for causing the noise detection device 2 to execute either processing of the correlation value calculation range generation processing, or the noise detection processing, is inputted to the input unit 21. The input unit 21 supplies the inputted instruction signal to the correlation value calculation range generator 16.

By the above-described processing, the noise detection device 2 of the second embodiment can generate the correlation value calculation ranges of the plurality of periodic noises in advance, and can detect the periodic noise accurately by means of a small computation amount.

The present invention is not limited to the embodiments described above, and is changeable in various ways within the scope without departing from the scope of the present invention. In an event of configuring the noise detection device according to the embodiments, choice of hardware or software is optional.

The noise detection program may be stored in a non-transitory computer readable storage medium, or may be provided by a communication line such as the Internet. The noise detection program may be a computer program product stored in a non-transitory computer readable medium.

What is claimed is:

1. A noise removal device used for a mobile communicator for removing a periodic noise included in an audio signal for improving quality of the audio signal, the noise removal device comprising:
   an audio signal input unit for acquiring an input audio signal and outputting a digital input audio signal;
   a processor configured to process the digital input audio signal;
   a first memory; and
   a second memory storing a correlation value calculation range,
wherein the processor
   generates an audio frame signal with a predetermined first time length from the digital input audio signal;
   generates a reference signal with a predetermined second time length from an audio signal located more in a past than a temporal position of the audio frame signal in the digital input audio signal;
   stores the audio frame signal and the reference signal in the first memory;
   calculates a correlation value between the audio frame signal and the reference signal stored in the first memory in the correlation value calculation range stored in the second memory;
   determines whether or not a periodic noise is included in the audio frame signal by comparing the correlation value with a predetermined threshold value;
   calculates a period of the periodic noise when the periodic noise is included in the audio frame signal;
   generates a correlation value calculation range based on the period of the periodic noise;
   stores the correlation value calculation range generated based on the period of the periodic noise in the second memory; and
   removes the periodic noise when the periodic noise is included in the audio frame signal.

2. The noise removal device according to claim 1, wherein the processor sets the correlation value calculation range to a range including the period of the periodic noise.

3. The noise removal device according to claim 1, wherein the processor sets the second time length to a time longer than a sum of the first time length and the period of the periodic noise.

4. A noise removal device used for a mobile communicator for removing a plurality of periodic noises included in an audio signal for improving quality of the audio signal, the noise removal device comprising:
   an audio signal input unit for acquiring an input audio signal and outputting a digital input audio signal;
   a processor configured to process the digital input audio signal;
   a first memory; and
   a second memory storing a plurality of correlation value calculation ranges,
wherein the processor
   generates an audio frame signal with a predetermined first time length from the digital input audio signal;
   generates a reference signal with a predetermined second time length from an audio signal located more in a past than a temporal position of the audio frame signal in the digital input audio signal;

stores the audio frame signal and the reference signal in the first memory;
calculates correlation values between the audio frame signal and the reference signal stored in the first memory;
calculates a plurality of correlation values between the audio frame signal and the reference signal stored in the first memory in the plurality of correlation value calculation ranges stored in the second memory;
determines whether or not a plurality of periodic noises are included in the audio frame signal by comparing the plurality of correlation values with a predetermined threshold value;
calculates each period of the plurality of the periodic noises when the plurality of the periodic noises are included in the audio frame signal;
generates a plurality of correlation value calculation ranges based on each period of the periodic noises;
stores the plurality of correlation value calculation ranges generated based on each period of the periodic noises in the second memory; and
removes the plurality of the periodic noises when the plurality of the periodic noises are included in the audio frame signal.

5. A noise removal method used for a mobile communicator for removing a periodic noise included in an audio signal for improving quality of the audio signal, the noise removal method comprising:
generating an audio frame signal with a predetermined first time length from an input digital audio signal;
generating a reference signal with a predetermined second time length from an audio signal located more in a past than a temporal position of the audio frame signal in the input digital audio signal;
determining whether or not a periodic noise is included in the audio frame signal by comparing the correlation value with a predetermined threshold value;
calculating a period of the periodic noise when the periodic noise is included in the audio frame signal;
generating a correlation value calculation range based on the period of the periodic noise;
storing the correlation value calculation range generated based on the period of the periodic noise in the second memory; and
removing the periodic noise when the periodic noise is included in the audio frame signal.

6. A computer program product, used for a mobile communicator for removing a periodic noise included in an audio signal for improving quality of the audio signal, stored in a non-transitory computer readable medium for causing a computer to perform the steps of:
a step of generating an audio frame signal with a predetermined first time length from an input digital audio signal;
a step of generating a reference signal with a predetermined second time length from an audio signal located more in a past than a temporal position of the audio frame signal in the input digital audio signal;
a step of storing the audio frame signal and the reference signal in a first memory;
a step of calculating a correlation value between the audio frame signal and the reference signal stored in the first memory in a correlation value calculation range stored in a second memory;
a step of determining whether or not a periodic noise is included in the audio frame signal by comparing the correlation value with a predetermined threshold value;
a step of calculating a period of the periodic noise when the periodic noise is included in the audio frame signal;
a step of generating a correlation value calculation range based on the period of the periodic noise;
a step of storing the correlation value calculation range generated based on the period of the periodic noise in the second memory; and
a step of removing the periodic noise when the periodic noise is included in the audio frame signal.

* * * * *